United States Patent [19]

Ball et al.

[11] Patent Number: 4,787,492
[45] Date of Patent: Nov. 29, 1988

[54] DOUBLE FRICTION CLUTCH WITH INDIVIDUAL CONTROL

[75] Inventors: Robert J. Ball, Bishops Itchington; John D. Banks, Whitnash, both of United Kingdom

[73] Assignee: Automotive Products plc, Leamington Spa, England

[21] Appl. No.: 51,394

[22] Filed: May 19, 1987

[30] Foreign Application Priority Data

May 20, 1986 [GB] United Kingdom ............... 8612213

[51] Int. Cl.$^4$ ...................... F16D 21/06; F16D 13/50
[52] U.S. Cl. ............................... 192/48.8; 192/70.27; 192/89 B; 192/98
[58] Field of Search .................. 192/48.1, 48.7, 48.8, 192/70.27, 89 B, 98

[56] References Cited

U.S. PATENT DOCUMENTS

| | | | |
|---|---|---|---|
| 2,613,778 | 10/1952 | Carlson | 192/48.8 |
| 3,185,274 | 5/1965 | Maurice | 192/48.8 |
| 3,212,611 | 10/1965 | Ruoff et al. | 192/48.8 |
| 3,489,256 | 1/1970 | Binder et al. | 192/89 B X |
| 3,749,213 | 7/1973 | Maucher | 192/48.8 |
| 3,841,455 | 10/1974 | Eastwood | 192/48.8 X |
| 4,116,322 | 9/1978 | Ashfield | 192/48.8 |
| 4,236,620 | 12/1980 | Beccaris | 192/48.8 |

FOREIGN PATENT DOCUMENTS

| | | |
|---|---|---|
| 1037523 | 7/1966 | United Kingdom . |
| 1167870 | 10/1969 | United Kingdom . |
| 1234313 | 6/1971 | United Kingdom . |
| 2006895 | 5/1979 | United Kingdom . |
| 2073341 | 10/1981 | United Kingdom . |

Primary Examiner—Rodney H. Bonck
Assistant Examiner—Richard M. Lorence
Attorney, Agent, or Firm—Solon B. Kemon

[57] ABSTRACT

A clutch assembly for independently controlling transmission of drive to a pair of concentric output shafts, comprises a first driven plate mounted on the inner shaft and arranged to be clamped between a first pressure plate and a driven fly wheel; and a second driven plate mounted on the outer shaft and arranged to be clamped between a second pressure plate and a reaction plate. Spring elements, are arranged to act against a pair of coaxial cover members, to urge the pressure plate into clamping engagement with driven plate and pressure plate into clamping engagement with driven plate; and release bearings are provided to selectively remove the clamping load applied to the driven plates. The cover members and reaction plate are drivingly interconnected and adapted to be connected in axially fixed realtionship to the fly wheel, and pressure plates are drivingly connected to the cover members and reaction plate while being moveable axially thereof.

7 Claims, 3 Drawing Sheets

DOUBLE FRICTION CLUTCH WITH INDIVIDUAL CONTROL

BACKGROUND TO THE INVENTION

The present invention relates to a friction clutch and in particular to a friction clutch assembly which will provide independent clutch control to a pair of concentric output shafts.

SUMMARY OF THE INVENTION

According to one aspect of the present invention a friction clutch assembly for independently controlling transmission of drive to a pair of concentric output shafts comprises; a first driven plate adapted to be mounted on the inner output shaft so as to be capable of transmitting torsional loads thereto while being free to move axially thereof; a first pressure plate mounted co-axially with the first driven plate for engagement of a frictional surface thereof; a reaction plate mounted co-axially of the first driven plate and first pressure plate and spaced axially thereof; a second driven plate mounted co-axially of the reaction plate and adapted to be mounted on the outer output shaft so as to be capable of transmitting torsional loads thereto while being free to move axially thereof; a second pressure plate mounted co-axially of the second driven plate for engagement of a frictional surface thereof; first and second cover members mounted co-axially of one another; spring means acting against the first cover member to urge the second pressure plate and second driven plate against the reaction plate, thereby applying a clamping load to the second driven plate; spring means acting against the second cover member to urge the first pressure plate to apply a clamping load to the first driven plate; and individual means associated with each spring means for relieving the load applied thereby to remove the clamping load applied to the associated driven plate; said first and second cover members being drivingly interconnected and fixed axially with respect to said reaction plate, and said first and second pressure plates being drivingly interconnected with said reaction plate, first and second cover members in a manner which will permit limited axial movement of each pressure plate relative thereto.

BRIEF DESCRIPTION OF THE DRAWINGS

An embodiment of the invention is now described, by way of example only, with reference to the accompanying drawings, in which.

DESCRIPTION OF A PREFERRED EMBODIMENT

Figure 1:
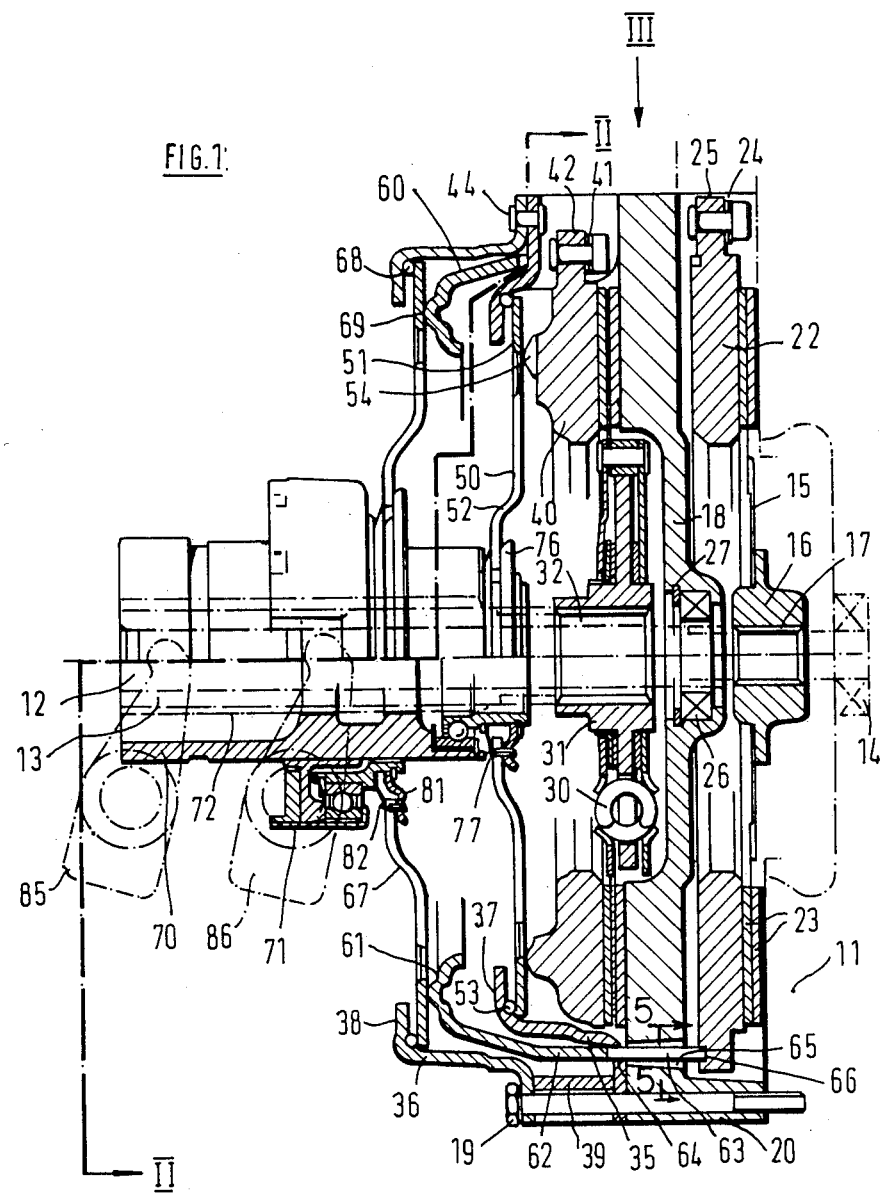
FIG. 1 is a part sectional side elevation of a friction clutch assembly formed in accordance with the present invention.
Figure 5:
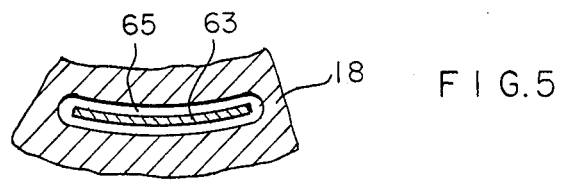
FIG. 5 is a section on the lines V—V of FIG. 1.
Figure 2:
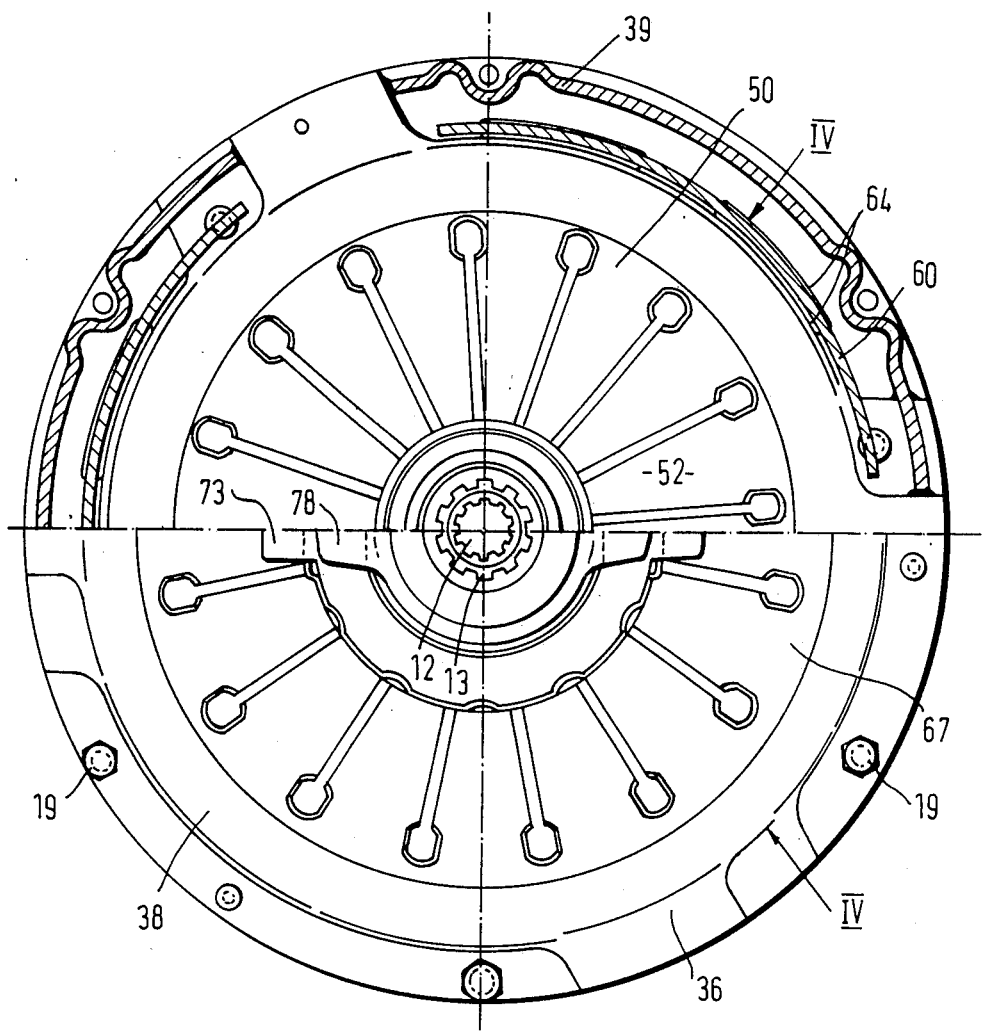
FIG. 2 is a section taken along the line II—II in FIG. 1.

The clutch assembly illustrated in the accompanying drawings is arranged to independently control transmission of drive between a flywheel 11 of an engine and a pair of concentric output shafts 12 and 13.

The end of the inner shaft 12 is engaged in a spigot bearing 14 at the centre of the flywheel 11. The driven plate 15 is mounted on the shaft 12, an integrally splined a hub 16 on the driven plate 15 engaging splines 17 on the shaft 12, so that torsional forces may be transmitted from the driven plate 15 to the shaft 12 while the driven plate 15 is free to move axially of the shaft 12.

A reaction plate 18 in the form of a dished casting having cylindrical flange portion 20 is secured to the flywheel 11, concentrically of the shafts 12 and 13, at circumferentially spaced locations by means of bolts 19.

An annular pressure plate 22 is interposed between the reaction plate 18 and driven plate 15, so that friction linings 23 on the driven plate 15 are sandwiched between opposed surfaces of the pressure plate 22 and the flywheel 11. The pressure plate 22 is drivingly connected to the reaction plate 18 by means of three sets of resilient straps 24 which extend between lugs 25 positioned symmetrically about the circumference of the pressure plate 22 and the reaction plate 18. These straps 24 locate the pressure plate 22 co-axially of the shafts 12 and 13 and permit a limited axial movement of the pressure plate 22 relative to the reaction plate 18. The straps 24 are also arranged such that when pressure plate 22 clamps driven plate 15 into engagment with flywheel 11, the straps 24 will apply an axial load to the pressure plate 22 away from the driven plate 15. Portions of the flange portion 20 of reaction plate 18 are cut away to provide clearance for the lugs 25 and straps 24 and to permit connection of the straps 24 to the reaction plate 18.

A bearing 26 is located on the internal diameter of the reaction plate 18 and is retained by circlip 27. The bearing 26 supports the end of the outer shaft 13. A second driven plate 30 is mounted upon the shaft 13, an internally splined hub 31 engaging with splines 32 on shaft 13, in similar manner to the interconnection between driven plate 15 and shaft 12.

First and second cover members 35 and 36 are mounted with respect to the flywheel 11 and reaction plate 18 by means of bolts 19. Each cover member 35 and 36 has an inwardly directed flange portion 37 and 38 respectively, which are spaced axially of one another. A cylindrical wall member 39 maintains the axial separation between the flange portions 37 and 38.

Figure 3:
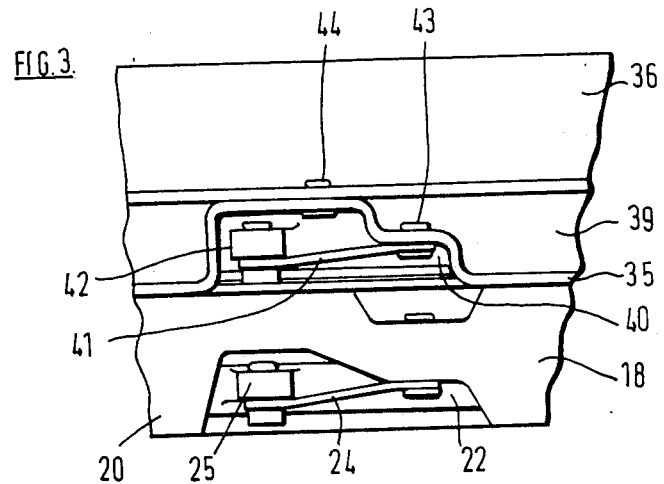
FIG. 3 is a partial view in the direction of arrow III in FIG. 1.
Figure 4:
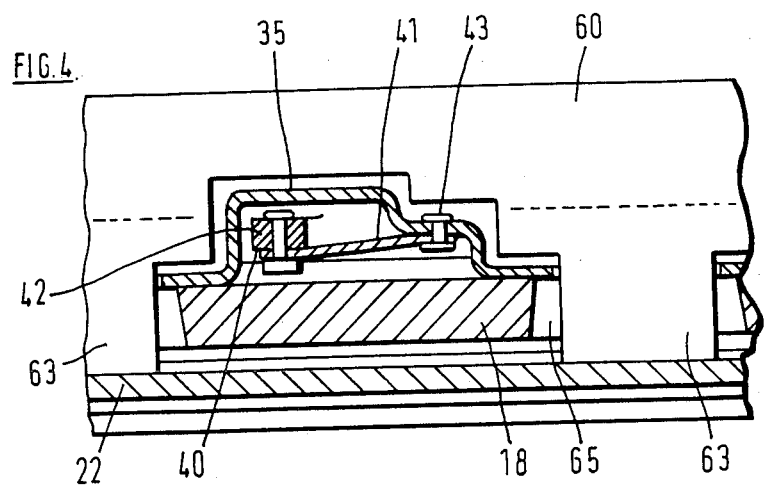
FIG. 4 is a section taken along the line IV—IV in FIG. 2.

A second annular pressure plate 40 is mounted co-axially of the shaft 13 so that the driven plate 30 is sandwiched between opposed faces of the pressure plate 40 and the reaction plate 18. The pressure plate 40 is drivingly connected to the cover member 35 by means of three sets of flexible straps 41 which are connected between symmetrically positioned lugs 42 on the pressure plate 40 and the cover member 35. In order to provide clearance for lugs 42 and straps 41, the wall member 39 is interrupted and the periphery of cover member 35 is stepped away from the reaction plate 18 as illustrated in FIG. 3. In this manner, the straps 41 may be connected to cover member 35 by means of rivets 43 and also at this point, cover member 35 may be attached directly to cover member 36 by means of rivets 44, so that prior to attachment of the clutch assembly to the flywheel 11 the assembly will be held together, pressing 60 abutting the outer flange of cover member 35 to prevent overstressing of the drive straps 24. The straps 41 will locate the pressure plate 40 co-axially of shaft 13 and will also permit limited axial movement of the pressure plate 40. The straps 41 also apply an axial load to the pressure plate 40 away from the driven member 30.

A diaphragm spring 50 having an outer Belleville portion 51 and inwardly directed fingers 52 is located between the flange 37 of cover member 35 and an annular projection 54 on pressure plate 40. The outer periphery of the Belleville portion 51 of diaphragm spring 50 engages the fulcrum ring 53 which is located against the flange 37. The diaphragm spring 50 is thereby arranged to act between the fulcrum ring 53 and the annular projection 54 to urge the pressure plate 40 axially away from the cover member 35, so as to force the driven plate 30 into frictional engagement with the reaction plate 18.

A annular pressing 60 has an inwardly directed flange portion 61 and a cylindrical portion 62. The end of the cylindrical portion 62 remote from the flange portion 61 is castellated to provide a series of axially extending arcuate fingers 63 which extend through corresponding arcuate apertures 64 and 65 in the cover member 35 and reaction plate 18 respectively, these fingers 63 engaging in an annular groove 66 in the pressure plate 22.

A diaphragm spring 67 of similar configuration to spring 50 acts between a fulcrum ring 68, located against the flange 38 of cover member 36 and an annular rib 69 on flange 61 of pressing 60 respectively, to urge the pressing 60 axially away from the cover member 36 and thus the pressure plate 22 and driven member 15 into frictional engagement with the flywheel 11.

A pair of release bearings 70 and 71 are mounted co-axially of one another about shafts 12 and 13. Release bearing 70 is slidably mounted upon a sleeve 72 which surrounds the shafts 12 and 13. A pair of diametrically opposed radially extending abutments 73 are provided at one end of the release bearing 70. These abutments 73 are engaged by the yoke of an actuating lever 85, so that the lever 85 will move the bearing 70 axially. The other end of the release bearing 70 engages the inner peripheral portion of fingers 52 of diaphragm spring 50, said portions of fingers 52 being clamped between an abutment 76 and a Belleville spring 77. By moving the release bearing 70 away from the flywheel 11, the load applied to the pressure plate 40 by diaphragm spring 50 may be relieved, thereby removing the clamping load on driven plate 30 and disengaging drive to shaft 13.

Release bearing 71 is slidingly mounted on release bearing 70, so that it is movable axially of the shafts 12 and 13, independently of release bearing 70. In a similar manner to release bearing 70, release bearing 71 is provided at one end with a pair of diametrically opposed radially extending abutments 78 which are engaged by the yoke of a second actuating lever 86. The other end of release bearing 71 engages the inner peripheral portion of diaphragm spring 67, the diaphragm spring 67 being engaged between an abutment 81 and a Belleville spring 82. Axial movement of bearing 71 away from the flywheel 11 will relieve the load applied to the pressure plate 22 by the diaphragm spring 67 via the annular pressing 60. This will remove the clamping load on driven plate 15 and disengage the drive to shaft 12. The actuating levers 85, 86 may thus be used to control independently, transmission of drive to shafts 12 and 13.

We claim:

1. A friction clutch assembly for independently controlling transmission of drive to a pair of concentric output shafts comprising a first driven plate adapted to be mounted on the inner output shaft so as to be capable of transmitting torsional loads thereto while being free to move axially; a first pressure plate mounted co-axially with the first driven plate for engagement of a frictional surface thereof; a reaction plate mounted co-axially of the first driven plate and first pressure plate and spaced axially thereof; a second driven plate mounted co-axially of the reaction plate and adapted to be mounted on the outer output shaft so as to be capable of transmitting torsional loads thereto while being free to move axially thereof; a second pressure plate mounted co-axially of the second driven plate for engagement of a frictional surface thereof; first and second cover members mounted co-axially of one another; first spring means acting between the first cover member and the second pressure plate to urge the second pressure plate and second driven plate against the reaction plate, thereby applying a clamping load to the second driven plate; second spring means acting between the second cover member and an annular pressing having a series of circumferentially separated axially extending arcuate fingers which extend through corresponding arcuate apertures in the first cover member and reaction plate and engage in a groove in the first pressure plate to urge the first pressure plate towards the first driven plate and apply a clamping load to the first driven plate; and individual means associated with each of the first and second spring means for relieving the load applied thereby to remove the clamping load applied to the associated driven plate; means being provided to drivingly interconnect said first and second cover members and fix them axially with respect to said reaction plate, said first and second pressure plates being drivingly interconnected with said reaction plate, first cover member and second cover member by means which will permit limited axial movement of each pressure plate relative thereto.

2. A friction clutch assembly according to claim 1 in which the first spring means acting between the first cover member and second pressure plate comprises a first diaphragm spring.

3. A friction clutch assembly according to claim 2 in which said first diaphragm spring acts against the first cover member about its outer periphery and engages said second pressure plate around an annular portion spaced inwardly of its outer periphery.

4. A friction clutch assembly according to claim 3 in which said individual means for relieving the spring load applied by the first diaphragm spring comprises a release bearing which moves the inner periphery of the first diaphragm spring away from the first and second pressure plates.

5. A friction clutch assembly according to claim 1 in which the second spring means acting between the second cover member and the first pressure plate is a second diaphragm spring.

6. A friction clutch assembly according to claim 5 in which the second diaphragm spring acts against the second cover member about its outer periphery and engages the annular pressing at an annular portion spaced inwardly from its outer periphery.

7. A friction clutch assembly according to claim 6 in which said individual means for relieving the spring load applied by the second diaphragm spring comprises a release bearing which moves the inner periphery of the second diaphragm spring axially away from the first and second pressure plates.

* * * * *